United States Patent [19]
Iketaki et al.

[11] Patent Number: 5,835,262
[45] Date of Patent: Nov. 10, 1998

[54] MULTI-WAVELENGTH OPTICAL MICROSCOPE

[75] Inventors: Yoshinori Iketaki, Tokyo; Masaaki Fujii, Kanagawa, both of Japan

[73] Assignees: Research Development Corporation of Japan, Kawaguchi; Olympus Optical Co., Ltd., Tokyo, both of Japan

[21] Appl. No.: 580,196

[22] Filed: Dec. 28, 1995

[30] Foreign Application Priority Data

Dec. 28, 1994 [JP] Japan ................................. 6-329165
Mar. 15, 1995 [JP] Japan ................................. 7-055714

[51] Int. Cl.$^6$ ................ G02B 5/30; G02B 13/14; G02B 21/06; F21V 9/16
[52] U.S. Cl. .................. 359/352; 359/355; 359/386; 250/458.1
[58] Field of Search ................ 359/368, 363, 359/371, 386, 352, 355; 250/458.1

[56] References Cited

U.S. PATENT DOCUMENTS

| | | | |
|---|---|---|---|
| 4,621,911 | 11/1986 | Lanni et al. | 359/386 |
| 5,034,613 | 7/1991 | Denk et al. | 250/458.1 |
| 5,218,195 | 6/1993 | Hakamata | 250/216 |
| 5,371,624 | 12/1994 | Nagano et al. | 359/389 |
| 5,523,573 | 6/1996 | Hänninen et al. | 250/459.1 |

*Primary Examiner*—Jon W. Henry
*Assistant Examiner*—Mark A. Robinson
*Attorney, Agent, or Firm*—Wenderoth, Lind & Ponack

[57] ABSTRACT

A high-accuracy multi-wavelength optical microscope for providing a satisfactory contrast of image and much information about a sample. The microscope includes a plurality of light sources, a wavelength varietor independently varying the wavelength of the individual light sources, and polarization plane rotators on the optical path for each light source.

6 Claims, 8 Drawing Sheets

MULTI-WAVELENGTH OPTICAL MICROSCOPE

FIELD OF THE INVENTION

The present invention relates to a high-accuracy multi-wavelength optical microscope which provides a satisfactory contrast of an image and much information about a sample. More particularly, the present invention relates to a multi-wavelength optical microscope which is suitably applicable for obtaining not only an enlarged image of a sample, but also a sufficient amount of information about the chemical composition thereof and the like.

The present invention also relates to a high-accuracy multi-wavelength optical microscope which permits, even with a very slight intensity of illuminating light, achievement of a long life of an excited state relative to multiple resonance absorption, an excellent contrast of image, and abundant information about a biological sample.

PRIOR ART

Optical microscopes of various constructions have so far been developed and used. As a result of recent progress made in peripheral technologies including laser and electronic image technologies, optical microscope systems of a further higher accuracy have been developed.

These include, for example, a bright-field microscope (transmission-type microscope), a dark-field microscope, and a scanning laser microscope.

From among these microscopes, the transmission-type microscope is used for observing a transmission image by irradiating a white light from a light source to a sample, as a transmission-type biological microscope.

There are known a phase-contrast microscope, a polarizing microscope, and differential interference (Nomarski) microscope as applications or the transmission-type microscope in response to the form and features of the sample to be observed.

Among others, the phase-contrast microscope is used for observing a transparent article having a refractive index different from that of the environment (medium), i.e., an article having only phase-contrast information, which permits observation through conversion of phase-contrast information into an amplitude intensity by the utilization of light interference.

The polarizing microscope is used for observing minerals, fibers and crystals particularly in terms of anisotropy of substances.

Similarly to the phase-contrast microscope, the differential interference microscope is used for observing a non-stained sample, to permit observation by converting a change in phase of optical wave caused by the sample into an interference image. The Nomarski microscope using polarization interference is well known.

The dark-field microscope is, on the other hand, to permit observation by obtaining an image from scattering light, fluorescence or diffraction light from the sample. It has a construction in which numerical apertures for the illuminating light is larger than numerical apertures of the objective lens. Light does riot directly come in, but a portion causing scattering, fluorescence or diffraction shines and is seen as an image in a dead dark background. As an application of this dark-field microscope, a pulse laser microscope using a pulse laser as the light source has recently been developed.

The scanning-type laser microscope is to permit observation of a transmission or fluorescent image by scanning the sample surface with a laser beam.

Optical microscopes of various systems and constructions have conventionally been utilized. In these conventional optical microscopes, however, it has been impossible to obtain a satisfactory image as a result of an insufficient picture quality including image contrast, because the illuminating structures to the sample had problems. With the conventional illumination based on a single wavelength, while it has been possible to observe an absorption image of particular molecules or a fluorescent image to some extent, it has been impossible to achieve an accurate determination of a chemical composition of a sample, since different molecules had generally wavelength regions of absorption zones overlapping each other. These conventional methods had problems in that the available amount of information about a sample has been insufficient.

As contrast of an image depends solely upon the sample thickness, a particular sample primarily determines a corresponding contrast in the transmission-type microscope. This is problematic in that contrast cannot be adjusted. Particularly when a white light is used as the light source and the sample is colorless and transparent as in a biological sample, a low light absorption has prevented achievement of an image of a satisfactory contrast. It has therefore been a conventional practice to adjust contrast by staining a sample with chemicals. However, this chemical staining, which may cause a change in the chemical composition of the sample, may lead to an impossibility to observe the original state of the sample. Particularly in the case of a biological sample, there is the risk of stopping the life activities of the sample under the effect of the chemicals. This chemical staining is often utilized in the bright-field microscope and dark-field microscopes. However, even when the sample is illuminated by a light of a wavelength falling within the absorption zone of the sample by spectroscopically dividing the light source, a strong absorption results in a dark image as a whole, thus giving a low-contrast image. The conventional microscopes have thus involved problems in an insufficient picture quality including contrast and an insufficient amount of available information, and instability of observation.

SUMMARY OF THE INVENTION

The present invention was developed to solve the problems involved in the prior art as described above, and has an object to provide a high-accuracy multi-wavelength optical microscope which solves the defects in the conventional optical microscope, gives a satisfactory contrast of an image and permits obtaining much information about a sample.

As a means to solve the above-mentioned problems, the present invention provides a multi-wavelength optical microscope having a plurality of light sources and wavelength varying means for independently varying the wavelength of the individual light beams, wherein different wavelengths are used for light beams from the individual light sources to obtain an absorption image when the ground state of sample molecules transmits to another excited state through one state, or a light-emitting image when the excited state decays to the ground state.

Additionally, there is an increasing demand for the development of a novel multi-wavelength optical microscope which, when observing a biological sample, permits increasing the absolute number of excited molecules by extending the life of the excited state to a length sufficient to allow multiple resonance absorption, even with a weak intensity of illuminating light.

The present invention also provides a multi-wavelength optical microscope provided with a multi-wavelength light source having variable wavelength as above, characterized in that a biological sample is immersed in an aqueous solution having a pH within a range from 0.5 to 10 of a sample holding section.

DETAILED DESCRIPTION OF THE INVENTION

In the multi-wavelength optical microscope of the present invention, as described above, individual illuminating light beams can have different wavelengths. It is thus possible to obtain an absorption image from an absorption process of the molecules composing a sample from the ground state to the primary excited state, and from a higher-order excited state including the primary one to a further higher-order excited state, and to obtain a light-emitting image from fluorescence or phosphorescence produced upon de excitation from those states of excitation. As wavelengths of the irradiated beams of light can be independently adjusted, it is possible to easily adjust contrast of a resultant image. Because each wavelength is intrinsic to the molecule of the sample, it is also possible to determine chemical composition or states of the sample.

With a view to explaining the principle of this multi-wavelength optical microscope, it is assumed that the resonance wavelength of the light causing transition of electrons of the valence electron orbit of the molecules forming the sample from the saturation orbit to a vacant orbit through transition from the ground state to the primary excited state is $\lambda_1$, and the resonance wavelength of the light causing transition of electrons of a saturation orbit approaching holes produced by the resonance wavelength $\lambda_1$ from the primary excited state to the secondary excited state is $\lambda_2$, then, the light of the resonance wavelength $\lambda_1$ and the light of the resonance wavelength $\lambda_2$ have the following relationship.

Figure 2:
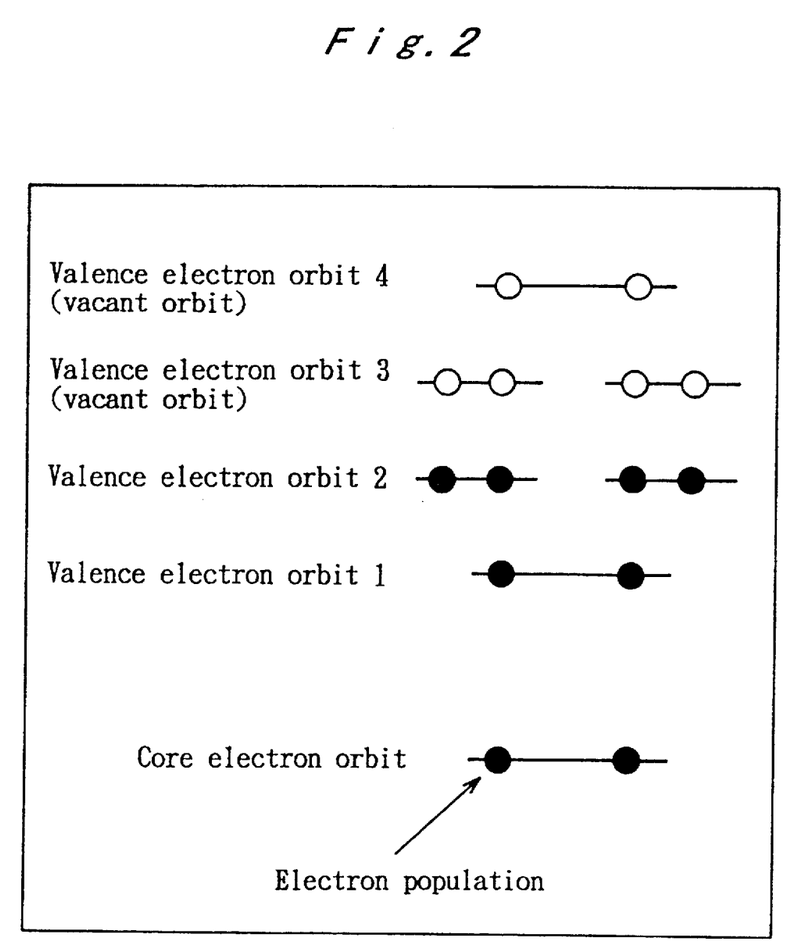
FIG. 2 shows a schematic representation of an electron structure of a valence electron orbit of molecules composing a sample (benzene)
Figure 3:
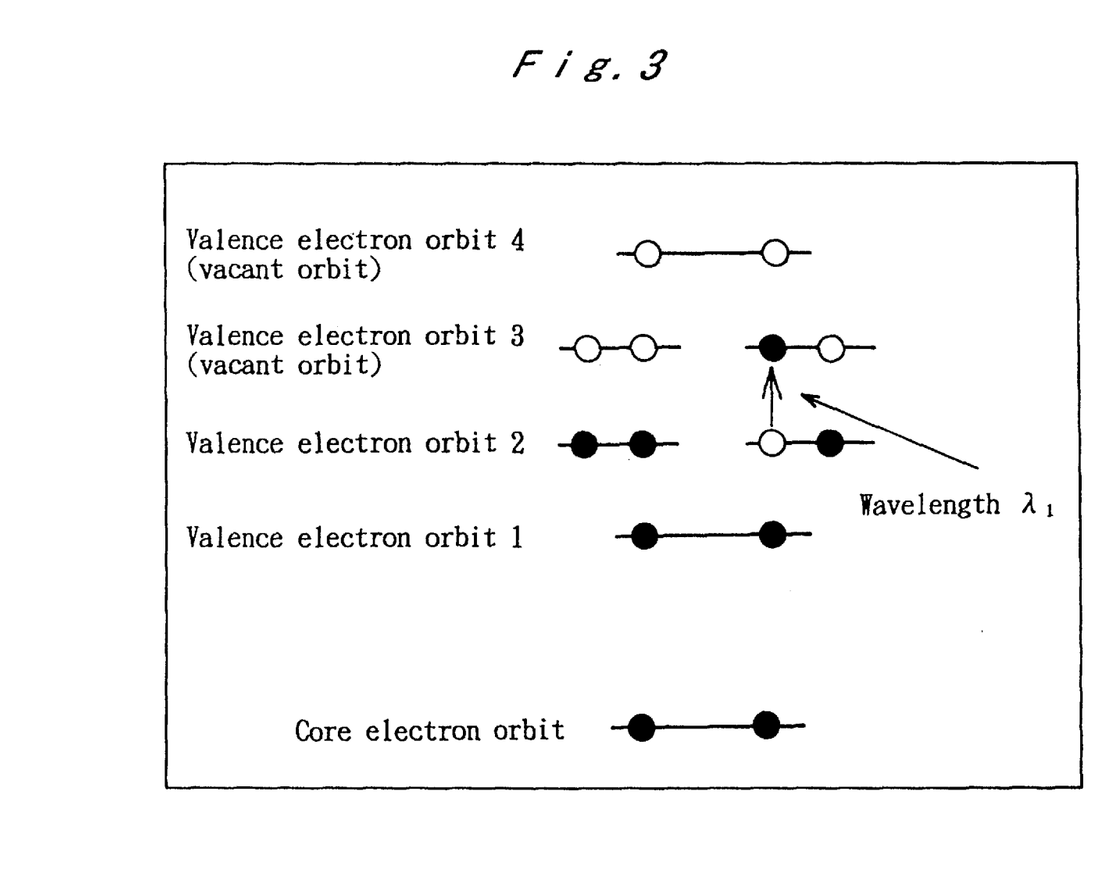
FIG. 3 shows a schematic representation of a primary excited state of the molecules shown in FIG. 2.
Figure 4:
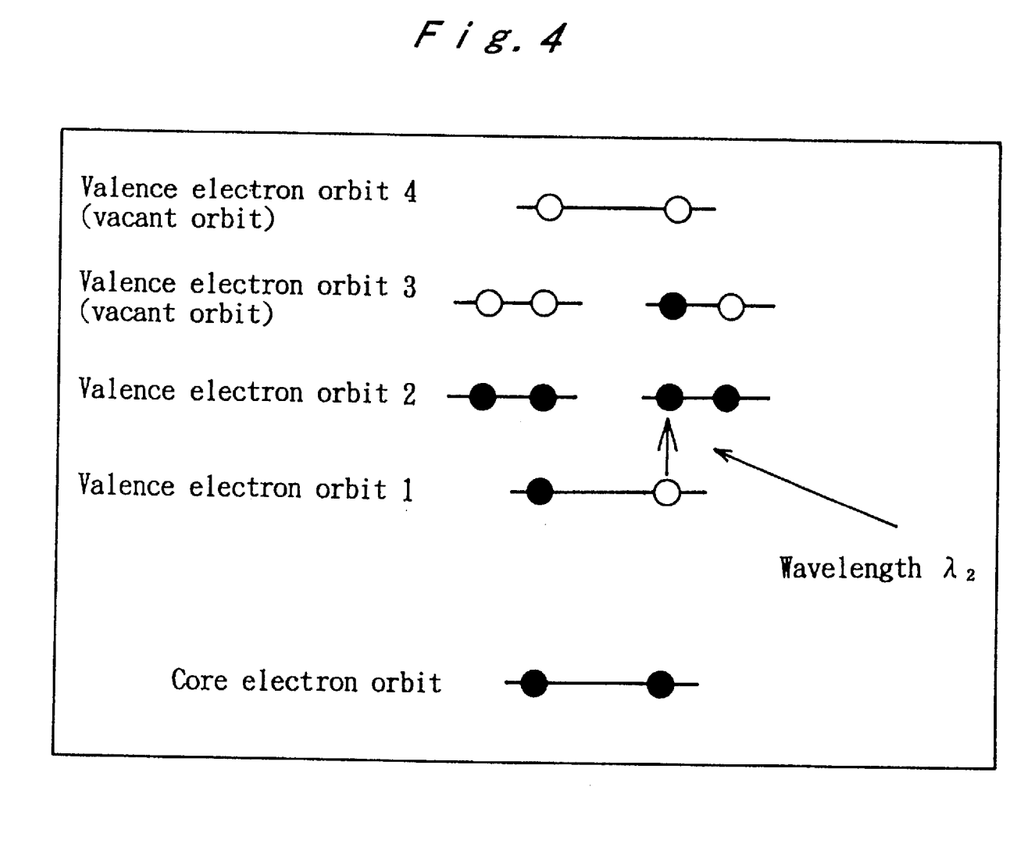
FIG. 4 shows a schematic representation of a secondary excited state of the molecules shown in FIG. 2.
Figure 5:
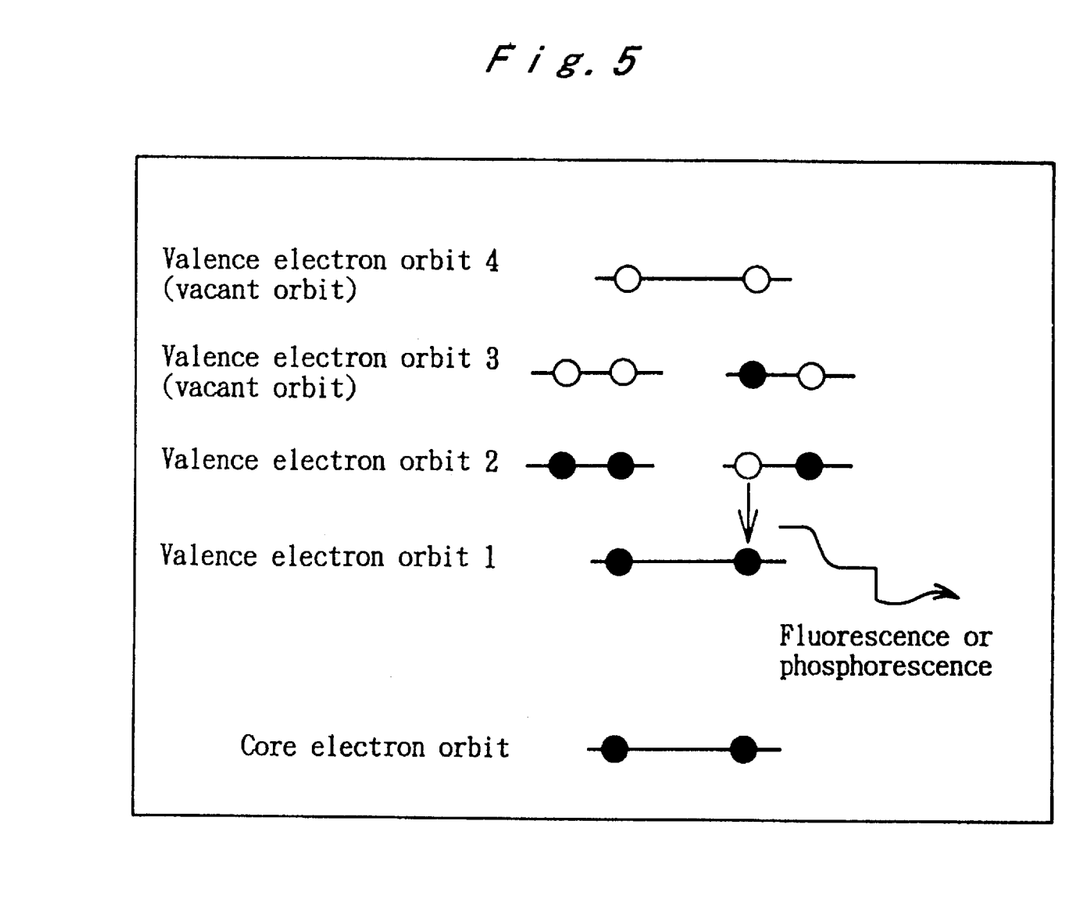
FIG. 5 shows a schematic representation of the decay process from the secondary excited state shown in FIG. 4 to the ground state.
Figure 6:
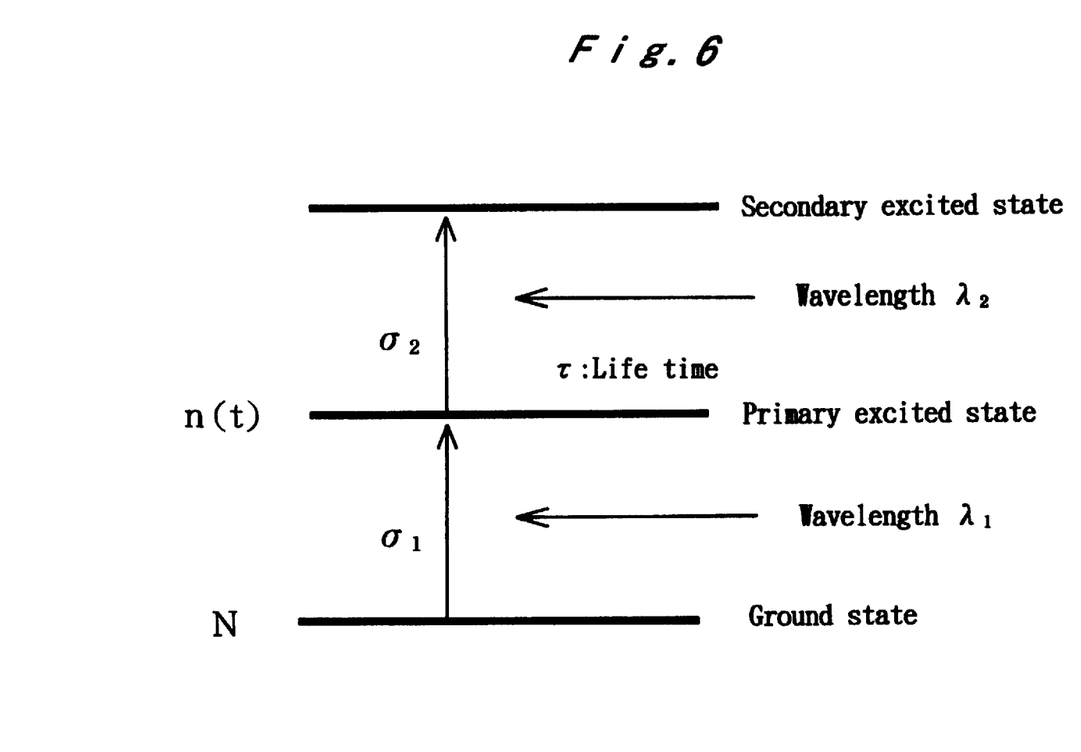
FIG. 6 shows a drawing illustrating an example of the excitation process (absorption process) of molecules.

More specifically, FIG. 2 illustrates the electron structure of the valence electron orbit of a benzene molecule as an example of sample. As shown in FIG. 2, for example, the valence electron orbit of the outermost shell of an individual sample is generally saturated. FIG. 3 illustrates the primary excited state of the molecule shown in FIG. 2. By exciting electrons from a saturated valence electron orbit 2 to a vacant valence electron orbit 3 by means of a light having a resonance wavelength $\lambda_1$, the ground state is transferred to the primary excitation. FIG. 4 illustrates the secondary excitation; transition occurs from the primary excitation state to the secondary excitation state by exciting, by a light of a resonance wavelength $\lambda_2$, electrons of the saturated valence electrode orbit 1 into vacant holes of the valence electron orbit 2 produced by the resonance wavelength $\lambda_1$. FIG. 5 illustrates the return from the secondary excitation shown in FIG. 4 to the ground state. Upon decay from the excited senate to the ground state, molecules emit fluorescence or phosphorescence. FIG. 6 illustrates the process of excitation (process of absorption). In the process shown in FIG. 6, the absorption sectional area during excitation from the ground state to the primary excited state is assumed to be $\sigma_1$, the life of the primary excitation at this point, $\tau$, and the absorption sectional area during excitation from the primary to the secondary excited states, a $\sigma_2$. Further, if the photon flux of the resonance wavelength $\lambda_1$ is Io, the irradiation time, T, and the density of molecules to be observed through resonance absorption, No, then, tho density N of molecules in the ground state at time T would be expressed by the following equilibrium equation:

$$\frac{dN}{dt} = -I_0\sigma_1 N + \frac{N_0 - N}{\tau} \quad (1)$$

The density n of molecules in the primary excited state after the lapse of time T under initial conditions including t=O and N=No is expressed by the following formula:

$$n = \left[ 1 - \exp\left\{ -\left(I_0\sigma_1 + \frac{1}{\tau}\right)T \right\} \right] \frac{N_0 I_0 \sigma_1 \tau}{1 + I_0 \sigma_1 \tau} \quad (2)$$

If the sample has a sufficient thickness, the photon flux Io of the light of a resonance wavelengtgh $\lambda_1$ is attenuated depending upon the penetration depth upon passing through the sample. The density n would therefore be a function n(x) of the penetration distance x of the light, Consequently, n(x) would be equal to [Formula 2] in which Io is replaced by Io exp($-\mu x$), where, $\mu$ is an absorption coefficient expressed by the following formula:

$$\mu = \sigma_1 N_0 \quad (3)$$

Formula (2) can therefore be rewritten as follows:

$$n(x) = \left[ 1 - \exp\left\{ -\left(I_0\sigma_1 e^{-\sigma_1 N_0 x} + \frac{1}{\tau}\right)T \right\} \right] \frac{N_0 I_0 \sigma_1 \tau e^{\sigma_1 N_0 x}}{1 + I_0 \sigma_1 \tau e^{-\sigma_1 N_0 x}} \quad (4)$$

When the light of wavelength $\lambda_1$ and the light of wavelength $\lambda_2$ are irradiated through the same optical path onto the sample, if absorption of the light of wavelength $\lambda_2$ is assumed to be non-existent when the light of wavelength $\lambda_1$ is not irradiated, the transmission T(L) of the light of wavelength $\lambda_2$ relative to the sample having a thickness L immediately after irradiation of the light of wavelength $\lambda_1$ is expressed as follows:

$$T(L) = \exp\left[ -\sigma_2 \int_0^L n(x)dx \right] \quad (5)$$

In general, $\tau$ is of the order of 1 nsec, and the irradiation time of the light of wavelength $\lambda_1$ is so long as about 10 nsec when using a pulse laser, permitting approximation T>>$\tau$. In addition, if L is assumed to be sufficiently large, Formula (5) can be expressed by the following formula:

$$T(L) = (1 + I_0 \sigma_1 \tau)^{-\frac{\sigma_2}{\sigma_1}} \qquad (6)$$

This formula suggests that T(L) is a function of Io, and T(L) almost linearly decreases as Io increases.

It is therefore possible to perfectly control the transmission image caused by the light of resonance wavelength $\lambda_2$ through control of photon flux Io of the light of resonance wavelength $\lambda_1$. As n(x) can be controlled as well through control of photon flux Io, it possible also to control the emission intensity of fluorescence or phosphorescence emitted during decay from the excited state to the ground state. It is therefore possible to adjust the image of the light of resonance wavelength $\lambda_2$ by the light of resonance wavelength $\lambda_1$.

As described above, the construction is imparted with a wavelength varying function which permits independent adjustment of laser beams spectroscopically divided. It is therefore possible to easily adjust contrast of an image, thereby obtaining a satisfactory contrast.

Chemical analysis of a sample is also possible through irradiation of two wavelengths including wavelength $\lambda_1$ and wavelength $\lambda_2$. As the outermost shell valence electron orbit has an energy level intrinsic to molecules, both wavelengths $\lambda_1$ and $\lambda_2$ are intrinsic to respective molecules. Molecules absorbed or emitting light by the action of the two wavelengths are thus limited, thereby permitting more accurate determination of chemical composition of a sample than before. Accordingly, it is also possible to obtain an amount of information about the sample other than the transmission image information.

In the present invention, furthermore, the polarization plane of the light of each wavelength can be controlled, thus making it possible to determine orientation of molecules, Additionally, it could be emphasized that there is a unique feature of this new optical microscope.

The feature is as follows. In general, the primary excited state as shown in FIG. 3 has a short life $\tau$ of about 1 n sec, and electrons are deexcited from the primary excited state to the ground state in a very short period of time. With a light of a resonance wavelength $\lambda_1$ having a weak intensity and n(x) is not so large, therefore, it is difficult to effectively cause a double resonance absorption of molecules, i.e., to excite molecules to the secondary excited state by the action of the light of resonance wavelength $\lambda_2$ before the primary excited state is deexcited into the ground state.

To overcome this problem, the above-mentioned multi-wavelength optical microscope uses a method of increasing the absolute number of excited molecules by irradiating a strong light of resonance wavelength $\lambda_1$. However, the necessity of a strong light requires a larger light source, and a particularly serious problem is that, because a strong light is irradiated onto the sample, and gives serious damage, an adverse effect on the sample is inevitable when the sample is any of various biological samples It has actually been difficult as a result to apply the above-mentioned multi-wavelength optical microscope to a biological sample.

In the present invention, the life of the excited state can be extended to a length of time sufficient to allow multiple resonance absorption even with a weak intensity of an illuminating light by immersing a biological sample in an aqueous solution having a pH within a range of from 0.5 to 10 and a temperature of up to 50° C. This ensures sufficient excited molecules even with a practically weak light. Consequently, there is no adverse effect on a biological sample, which is inevitable in the irradiation of a high-intensity illuminating light, and elimination of the necessity of a strong illuminating light in turn eliminates the necessity of a large light source.

Furthermore the possibility of extending the life of excited state permits obtaining an accurate image of a better contrast. This is evident from the fact, in the above-mentioned Formula(6), that the transmission T is a simply decreasing function of the life of excitation $\tau$. More specifically, since a longer life of excitation $\tau$ can lead to a larger absorption of the sample, and a strong absorption can be caused effectively with a small amount of photon flux Io, a more accurate image is available.

Now, the present invention is described in further detail below by means of examples. It is needless to mention that the present invention is not limited to the following embodiment.

EXAMPLE 1

Figure 1:
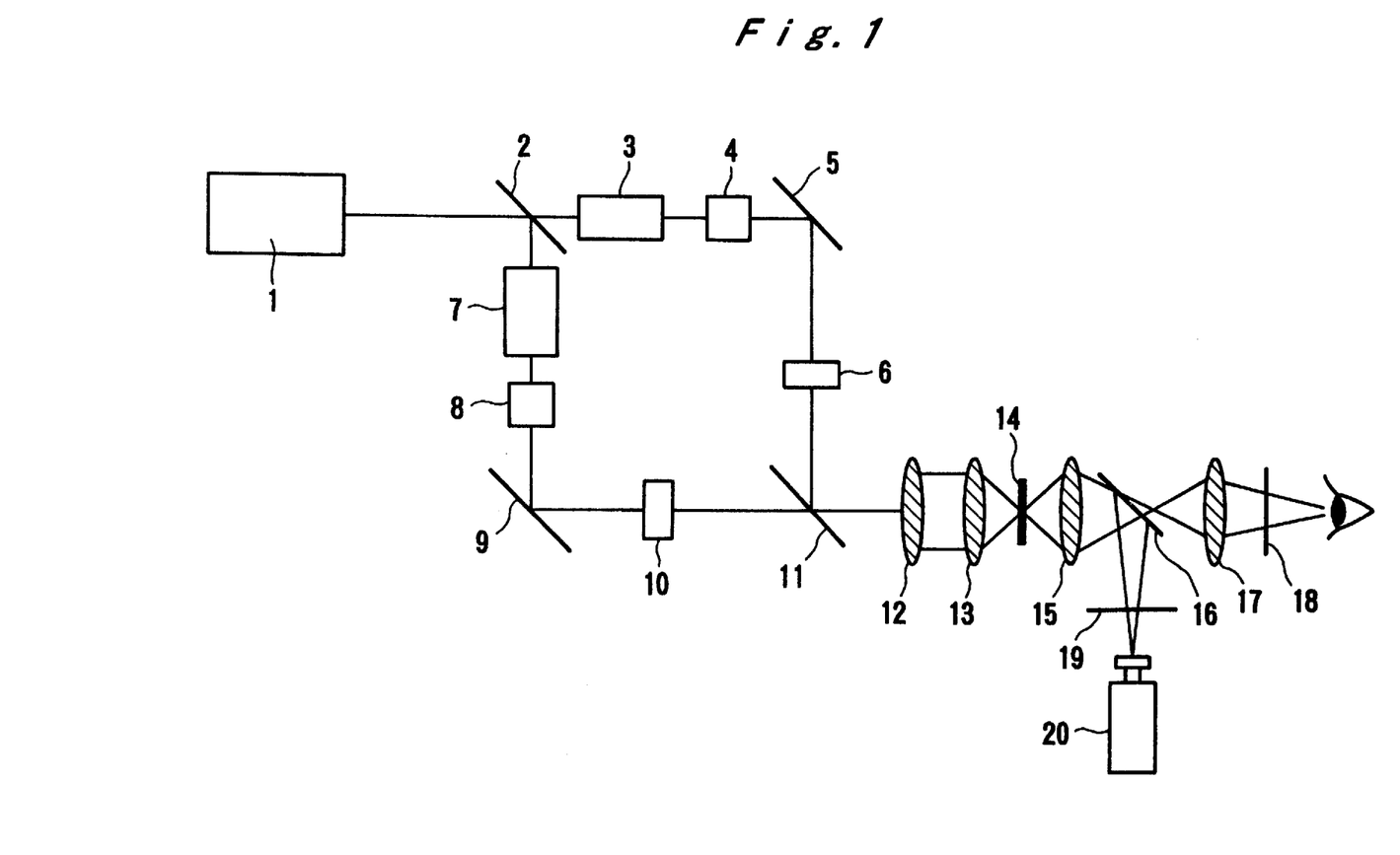
FIG. 1 shows a configuration diagram of an embodiment of the multi-wavelength optical microscope of the present invention.

FIG. 1 is an embodiment of the multi-wavelength optical microscope of the present invention in the form of a two-wavelength optical microscope using two dye lasers (3) and (7) as light sources.

An Nd:YAG laser is used as the pump light source (1). A half-mirror (2) installed adjacent to the pump light source (1) spectroscopically divides a laser beam, the two resultant laser beams pumping the dye laser (3) and the dye laser (7), respectively. The wavelength of the dye laser (3) is adjusted to a resonance wavelength $\lambda_1$ capable of causing transition from the ground state to the primary excited state by exciting electrons on the valence electron orbit of molecules composing the sample from a saturated orbit to a vacant one. When a light of a short wavelength is necessary at this point, an SHG second harmonics oscillator (4) is installed as required after the dye laser (3) to reduce wavelength. The wavelength of the dye laser (7) is, on the other hand, adjusted to a resonance wavelength $\lambda_2$ capable of causing transition from the primary excited state to a secondary one by exciting electrons on a saturated orbit close to vacant hole orbit to the vacant holes produced by the wavelength $\lambda_1$. When reducing the laser beam wavelength at this point, an SHG (8) is similarly provided after the dye laser (7) to reduce wavelength. These steps permit achievement of light beams of two wavelengths including the resonance wavelength $\lambda_1$ and the resonance wavelength $\lambda_2$ from the single light source. The directions of the light of wavelength $\lambda_1$ and the light of wavelength $\lambda_2$ are changed by mirrors (5) and (9), respectively, brought together by a half-mirror (11) into a single optical path. The light of each wavelength is enlarged by a telescope (12) and irradiated through a condenser lens (13) onto a sample (14). The molecules composing the sample are excited by these irradiated laser beams, and an absorption image is obtained through the then absorption process of electrons. A light-emitting image is available under the effect of fluorescence or phosphorescence emitted upon when the excited state decays to the ground state. The images form images on the retina of the observer by means of an eye lens (17) through a half-mirror (16) after enlargement by an objective (15). With a view to permitting observation of only the image of the beam of wavelength $\lambda_2$ by cutting the beam of wavelength $o_1$, a filter (18) may from time to time be inserted as required after the objective (17). The optical path of the beam reflected by the half-mirror (16) provided between the objective (15) and the eye lens (17) is changed, and a transmission image can simultaneously be observed by means of a TV camera (20) installed separately from the eye lens on the thus changed optical path. To permit observation of only the image formed by the beam of wavelength $\lambda_2$ by cutting the beam of wavelength $\lambda_1$, a filter (19) can similarly be inserted between the half-mirror (16) and the TV camera (20).

In this two-wavelength optical microscope, the contrast of the transmission image formed by the light of wavelength $\lambda_2$ can be adjusted by controlling the light intensity of the beam of wavelength $\lambda_1$ through adjustment of output from the dye laser (3).

Further in this two-wavelength optical microscope, a polarization plane rotator (6) is provided between the mirror (5) and the half-mirror (11) on the optical path for the light of wavelength $\lambda_1$, and a polarization plane rotator (10) is provided between the mirror (9) and the half-mirror (11) on the optical path for the light of wavelength $\lambda_2$. Because, when valence electrons are excited, the light with a particular electric field vector is absorbed by the molecular, the molecular orientation can simultaneously be observed and determined by controlling the polarization plane (direction) of the light of wavelength $\lambda_1$ by means of the polarization plane rotator (6), and controlling the polarization plane (direction) of the light of wavelength $\lambda_2$ by means of the polarization plane rotator (10). This makes it possible to further obtain information about the sample other than the transmission image information. A wave plate or a prism can be used as the polarization plane rotator.

It is needless to mention that the multi-wavelength optical microscope is not limited to the one using the above-mentioned two-wavelength light, but a wavelength varying laser such as a dye laser may be added, and the optical microscope may have a light source for three or more wavelengths. As the light source, a white light source such as a mercury lamp may be used. In this case, an image is available by monochronaize a light into multiple wavelengths through a diffraction grating, and then illuminating a sample by arranging the optical paths into one.

The multi-wavelength optical microscope of the present invention is of course applicable not only for various bright-field microscopes, but also for dark-field microscopes such as a fluorescent microscope and a scanning-type laser microscope.

The present invention, having the construction as described above in detail, provides the following effects:

(a) Because of the possibility of using different wavelengths of illuminating light beams, it is possible to obtain an absorption image through the absorption process by causing transition of molecules composing a sample from the ground state to the primary excited state, and from a higher-order excited state including the primary one to a further higher-order excited state, end to obtain a light-emitting image from fluorescence or phosphorescence produced upon deexcitation from an excited state.

(b) As wavelengths of illuminating light beams can be individually adjusted, contrast of the resultant image can easily be adjusted.

(c) Since each wavelength is intrinsic to molecules of a sample, it is possible to determine a chemical composition of the sample. It is therefore possible to obtain an enlarged image of the sample and additional information about chemical composition and the like at the same time.

(d) The polarization plane of the light of each wavelength can be controlled, thus making it possible to determine the molecular orientation, and hence to obtain much information about the sample.

The present invention is not restricted by the above-mentioned Example. Many embodiments providing the present multi-wavelength optical microscope could be used.

For example, the optical Parametric Oscillate using laser-excitation can be used for the present invention.

EXAMPLE 2

Figure 7:
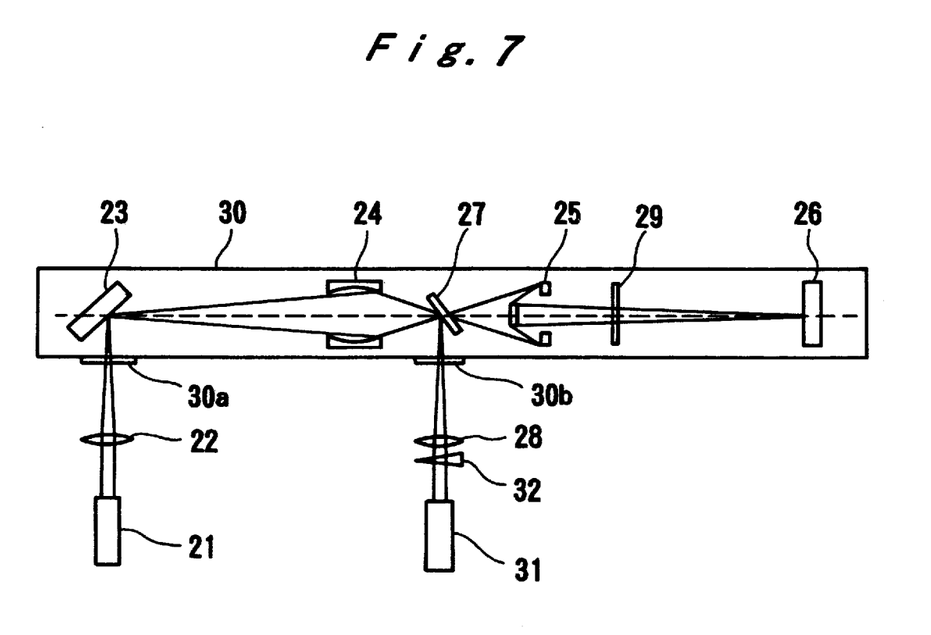
FIG. 7 shows a configuration diagram illustrating a system configuration for the optical microscope of the present invention in case of soft x-ray region.

FIG. 7 illustrates an embodiment of system configuration to which the X-rays and ultraviolet-rays multi-wavelength biological optical microscope of the present invention is applicable.

The illustrated embodiment is a system already proposed by the present inventors (Japanese Patent Provisional Publication No. HO6-265,698) (Japanese Patent Provisional Publication No. HO6-265,699). The multi-wavelength optical microscope of the present invention is achieved, for example, using this system.

As shown in FIG. 7 as an example, this system configuration comprises a laser plasma X-ray source which generates X-rays by condensing a laser bean) generated by an Nd:YAG laser (21) through a condenser lens (22) and causing the thus generated laser beam to hit a target (23); an X-ray optical path, having a condenser lens (24), an objective (25), an ultraviolet cutting filter (29) and a detector (26), which irradiates X-rays to a sample (27) to obtain a transmission X-ray microscopic image; and an ultraviolet-ray optical path which adjusts the luminous energy of the laser beam generated by an ultraviolet laser (31) through a glass wedge (32), then condenses the ultraviolet laser (31) through a condenser lens (28) and irradiates it to the sample (27) in a vacuum chamber (30), and is formed into an image formation type X-ray microscope. The components other than the Nd:YAG laser (21), the condenser lens (22), the ultraviolet laser (14), the glass wedge (32) and the condenser lens (28) among the components of the optical paths describe above are housed in the vacuum chamber (30), and portions of the vacuum chamber (30) for transmission of the laser beam and the ultraviolet-rays are provided with transmitting windows (30) and (30b), respectively.

In the above-mentioned configuration, the X-ray optical axis and the ultraviolet-ray optical axis orthogonally cross each other at the irradiated portion of the sample, and the sample (27) is tilted so as to form a prescribed angle (45°, for example) with the X-ray optical axis and the ultraviolet-ray optical axis, the arrangement thereof being such that the normal of the sample surface is not in parallel with the X-ray optical axis. This configuration is optimum in the case where the intervals between the condenser lens, the sample and the objective on the X-ray optical path are very tight. The transmission X-ray microscopic image of a sample inclined by 45°, for example, available from this configuration is a $1:(1/\sqrt{2})$ projected image formed on the image forming surface of the detector (26). It is therefore necessary to digitize the incorporated image, and then to restore the 1:1 original image by using coordinate conversion through a software program or an arithmetic circuit, not shown, separately provided. It is thus possible to irradiate sufficient ultraviolet rays to the sample by the application of this restoring treatment, even with a configuration in which the X-ray optical system is close to the sample.

In the above-mentioned configuration, a rotational ellipsoidal mirror is used as the condenser lens (24), or a Schwarzschield optical system as the objective (25), with the surface thereof coated with a carbonaceous multilayer film of, for example, Ni/C or W/C, so as to achieve the highest possible transmission of the optical system within a wavelength region of from 65 to 43.7 A. Furthermore, a material having a high transmission of ultraviolet rays of a long wavelength of at least about 200 nm (diamond, fluorspar, etc.) is used as the above-mentioned optical window (30b).

The above-mentioned configuration is only an example, and it is needless to mention that the system configuration of the present invention is not limited to this one.

For example, by using the multi-wavelength optical microscope of the present invention having the above-mentioned system, tryptophan molecules, which are biological amino acid molecules, immersed in an aqueous solution having a pH of 10.5 and another aqueous solution having a pH of 5.5, were observed through double resonance absorption based on irradiation of ultraviolet-rays/soft X-rays to compare values of pH of aqueous solutions, the life time of excitation and photon flux of ultraviolet laser.

Figure 8:
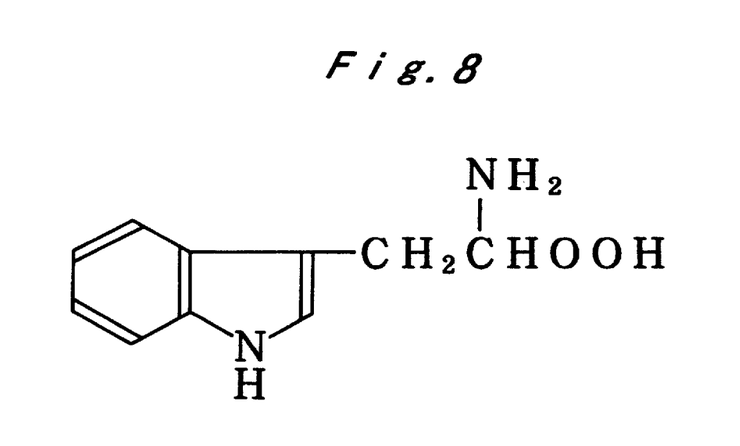
FIG. 8 shows a molecular structural diagram of tryptophan serving as a biological sample.
Figure 9:
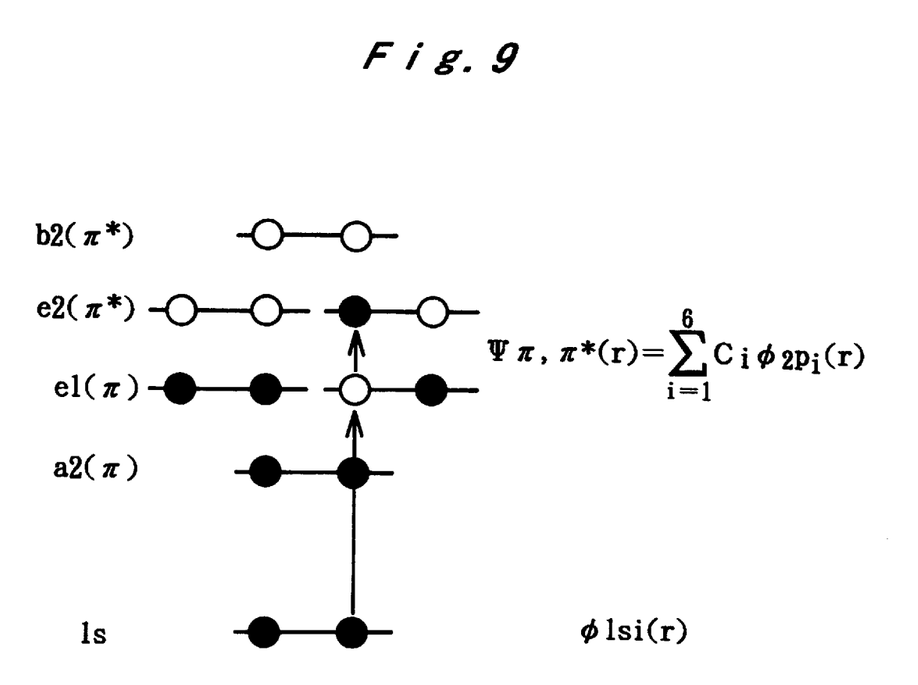
FIG. 9 shows a drawing illustrating an example of the excitation process (absorption process) of tryptophan molecules.

FIG. 8 illustrates the molecular structure of tryptophan molecule. As is clear from FIG. 8, a tryptophan molecule contains a benzene ring. FIG. 9 illustrates the process of double resonance absorption of ultraviolet-rays/soft X-rays relative to this benzene ring. First, electrons on the e1 orbit which is the outermost shell are excited to the e2 orbit by irradiating an ultraviolet laser having a wavelength of 266 nm. Then, before deexcitation of this excited state, i.e., within the period of excitation life time, carbon 1s electrons are excited into vacant holes of the e1 orbit by irradiating soft X-rays having a wavelength of 4.4 nm.

Now, it is considered below how far it is possible to reduce photon flux of ultraviolet laser by optimizing the excitation life time by means of pH value. First, using physical constants already released, a transition T of soft X-rays is determined from Formula(6).

If the sample tryptophan is dissolved at a sufficient concentration in an aqueous solution, the transmission T of soft X-rays is determined from the following Table 1 (physical constants for UV-laser beam) and Table 2 (physical constants for tryptophan).

TABLE 1

| Laser wavelength | 266 nm |
| Laser energy | 0–5 mJ |
| Sample beam size | 2 mm $\phi$ |
| Io: photon flux | 0–4 × $10^{25}$/cm$^2$/sec |

TABLE 2

| $\tau$; e1 hole life time (pH: 0.5) | 4.5 nsec[1] |
| e1 hole life time (pH: 5.5) | 6.2 nsec[1] |
| $\sigma_1$: e1 → e2 absorption Cross-section (266 nm) | 8 Mb[2] |
| $\sigma_2$: C: 1s → e1 absorption Cross-section | 10 Mb |

[1] L. P. McMahon et al. J. Am. Chem. Soc. 114 (1992) 8442–8448
[2] D. Wetlaufer Adv. Protein Chem. 17 (1962) 303–390

In the case of an aqueous solution having a pH-value of 10.5 (excitation life $\tau$=4.5 nsec, Io=4×$10^{25}$/cm$^2$/sec), the transmission of soft X-rays is 0.35. When observing an absorption image of the sample by the use of the multi-wavelength optical microscope of the present invention, which is a transmission-type optical microscope, an absorption image having a sufficient contrast is available with a transmission T of 0.35. With a pH-value of 5.5 of the aqueous solution (excitation life time $\tau$=6.2 nsec), the transmission of soft X-rays is larger than 0.35. When using the aqueous solution with a pH-value of 5.5, photon flux Io of the ultraviolet laser can be adjusted to 2.5×$10^{25}$/cm$^2$/sec so as to reach a transmission T of 0.35. As compared with the value of photon flux Io of 4×$10^{25}$/cm$^2$/sec when using an aqueous solution having a pH-value of 10.5, this accounts for about 60%. This therefore reveals that a sufficient contrast is available by adjusting pH-value of the aqueous solution to 5.5, i.e., by the irradiation of a laser beam of a small photon flux, i.e., of a low intensity.

From the findings described above, it is confirmed that a sufficient contrast is available even by the irradiation of a weak laser beam, for tryptophan or other biological samples, within a range of pH of from 1.5 to 10.

The aqueous solution temperature should preferably be the lowest possible. For tryptophan molecule, a temperature of over 50° C. results in an excitation life time $\tau$ of under 3 nsec, thus making it impossible to achieve a sufficiently long excitation life time with a low-intensity laser beam.

For tryptophan molecule, as is evident from the findings as described above, it is possible to achieve a sufficiently long excitation life relative to double resonance absorption even in the irradiation of a low-intensity illuminating light of the slightest photon flux, by immersing it in an aqueous solution having a pH-value of from 1.5 to 10 and at a temperature of up to 50° C., or more preferably, of up to 30° C., thereby permitting obtaining a transmission image of a satisfactory contrast.

The above-mentioned example shows observation of tryptophan molecules through ultraviolet rays/soft X-rays double resonance absorption. It is needless to mention that a sufficient contrast is similarly available by the irradiation of a low-intensity illuminating light, even for other molecules, by adjusting the pH-value of the aqueous solution within a range of from 1.5 to 10 and the temperature to up to 50° C. A similar effect is available also in double resonance absorption of UV-UV, UV-visible, visible-soft X-rays, or any other wavelength region. A similar effect is of course available also in multiple resonance absorption using two or more wavelengths.

According to the present invention having the construction as described above in detail, it is possible to extend the life time of excited the state to a length of time sufficient to ensure multiple resonance absorption, even for a low intensity of the illuminating light, by immersing a biological samples in an aqueous solution having a pH-value within a range of from 0.5 to 10 and at a temperature of up to 50° C., thereby permitting prevention of an adverse effect of the irradiation of a high-intensity illuminating light on the biological sample, and further, elimination of the necessity of a larger light source because of the absence of necessity of a high-intensity illumination.

Furthermore, of the possibility to extend the excitation lifetime, it is possible to increase transmission of an illuminating light, and hence to obtain an accurate image of a better contrast.

What is claimed is:

1. A multi-wavelength optical microscope comprising:

a plurality of light sources; and wavelength varying means for independently varying the wavelength of individual ones of said plurality of light sources such that at least one of said plurality of light sources irradiates a light beam having a wavelength capable of causing the transition of a sample molecule from a ground state to an excited state and, within a lifetime of the excited state, another one of said plurality of light sources irradiates a light beam having a wavelength capable of causing the transition of the sample molecule from the excited state to a higher-order excited state to obtain one of a) an absorption image when the ground state transits to the higher-order excited state via the excited state, and b) a light emitting image when the higher-order excited state decays to the ground state via the excited state.

2. The multi-wavelength optical microscope as claimed in claim 1, wherein an optical path of each of said plurality of light sources is provided with a polarization plane rotator.

3. A multi-wavelength optical microscope as claimed in claim 1, wherein at least one filter is included to permit observation of a selected image.

4. A multi-wavelength optical microscope as claimed in claim 2, wherein at least one filter is included to permit observation of a selected image.

5. A multi-wavelength optical microscope as claimed in claim 3, wherein at least one filter is included to permit observation of a selected image.

6. A multi-wavelength optical microscope as claimed in claim 4, wherein at least one filter is included to permit observation of a selected image.

\* \* \* \* \*